United States Patent
Song

(10) Patent No.: US 7,176,988 B2
(45) Date of Patent: Feb. 13, 2007

(54) LIQUID CRYSTAL DISPLAY PANEL AND METHOD OF MAKING THE SAME

(75) Inventor: Sang Moo Song, Daegu (KR)

(73) Assignee: LG.Philips LCD Co., Ltd., Seoul (KR)

( * ) Notice: Subject to any disclaimer, the term of this patent is extended or adjusted under 35 U.S.C. 154(b) by 0 days.

(21) Appl. No.: 10/607,206

(22) Filed: Jun. 27, 2003

(65) Prior Publication Data

US 2004/0090561 A1   May 13, 2004

(30) Foreign Application Priority Data

Nov. 11, 2002   (KR) ...................... 10-2002-0069690

(51) Int. Cl.
G02F 1/1343   (2006.01)
(52) U.S. Cl. ........................... 349/38; 349/42; 349/143
(58) Field of Classification Search .................. 349/38, 349/143, 42
See application file for complete search history.

(56) References Cited

U.S. PATENT DOCUMENTS 5,253,091 A * 10/1993 Kimura et al. ................ 345/94
5,436,747 A * 7/1995 Suzuki ......................... 349/42
2002/0008792 A1 * 1/2002 Chung et al. ................ 349/38

FOREIGN PATENT DOCUMENTS

| JP | H04-251285 | 9/1992 |
|----|-----------|--------|
| JP | H09-016132 | 1/1997 |

OTHER PUBLICATIONS

Office Action issued by the Japanese Patent Office on Aug. 29, 2006.

\* cited by examiner

*Primary Examiner*—David Nelms
*Assistant Examiner*—(Nancy) Thanh-Nhan Phan Nguyen
(74) *Attorney, Agent, or Firm*—McKenna Long & Aldridge LLP

(57) ABSTRACT

A liquid crystal display panel capable of improving a picture quality and reducing power dissipation includes a plurality of liquid crystal cells each having a thin film transistor formed at a crossing of gate lines and date lines, and a pixel electrode connected to the thin film transistor; a first parasitic capacitor formed between a data line and an adjacent preceding or succeeding pixel first electrode; a second parasitic capacitor formed between the data line and an preceding or succeeding pixel second electrode; and a groove formed at a portion of the pixel electrode adjacent the data line and opposing a portion coupled to the thin film transistor.

17 Claims, 8 Drawing Sheets

FIG.2A
RELATED ART

|   |   |   |   |   |   |   |   |
|---|---|---|---|---|---|---|---|
| + | + | + | + | + | + | + | + |
| + | + | + | + | + | + | + | + |
| + | + | + | + | + | + | + | + |
| + | + | + | + | + | + | + | + |
| + | + | + | + | + | + | + | + |
| + | + | + | + | + | + | + | + |
| + | + | + | + | + | + | + | + |
| + | + | + | + | + | + | + | + |

FIG.2B
RELATED ART

|   |   |   |   |   |   |   |   |
|---|---|---|---|---|---|---|---|
| − | − | − | − | − | − | − | − |
| − | − | − | − | − | − | − | − |
| − | − | − | − | − | − | − | − |
| − | − | − | − | − | − | − | − |
| − | − | − | − | − | − | − | − |
| − | − | − | − | − | − | − | − |
| − | − | − | − | − | − | − | − |
| − | − | − | − | − | − | − | − |

| + | − | + | − | + | − | + | − |
|---|---|---|---|---|---|---|---|
| + | − | + | − | + | − | + | − |
| + | − | + | − | + | − | + | − |
| + | − | + | − | + | − | + | − |
| + | − | + | − | + | − | + | − |
| + | − | + | − | + | − | + | − |
| + | − | + | − | + | − | + | − |
| + | − | + | − | + | − | + | − |

FIG. 4B
RELATED ART

| − | + | − | + | − | + | − | + |
|---|---|---|---|---|---|---|---|
| − | + | − | + | − | + | − | + |
| − | + | − | + | − | + | − | + |
| − | + | − | + | − | + | − | + |
| − | + | − | + | − | + | − | + |
| − | + | − | + | − | + | − | + |
| − | + | − | + | − | + | − | + |
| − | + | − | + | − | + | − | + |

FIG.5A
RELATED ART

| + | − | + | − | + | − | + | − |
|---|---|---|---|---|---|---|---|
| − | + | − | + | − | + | − | + |
| + | − | + | − | + | − | + | − |
| − | + | − | + | − | + | − | + |
| + | − | + | − | + | − | + | − |
| − | + | − | + | − | + | − | + |
| + | − | + | − | + | − | + | − |
| − | + | − | + | − | + | − | + |

FIG.5B
RELATED ART

| − | + | − | + | − | + | − | + |
|---|---|---|---|---|---|---|---|
| + | − | + | − | + | − | + | − |
| − | + | − | + | − | + | − | + |
| + | − | + | − | + | − | + | − |
| − | + | − | + | − | + | − | + |
| + | − | + | − | + | − | + | − |
| − | + | − | + | − | + | − | + |
| + | − | + | − | + | − | + | − |

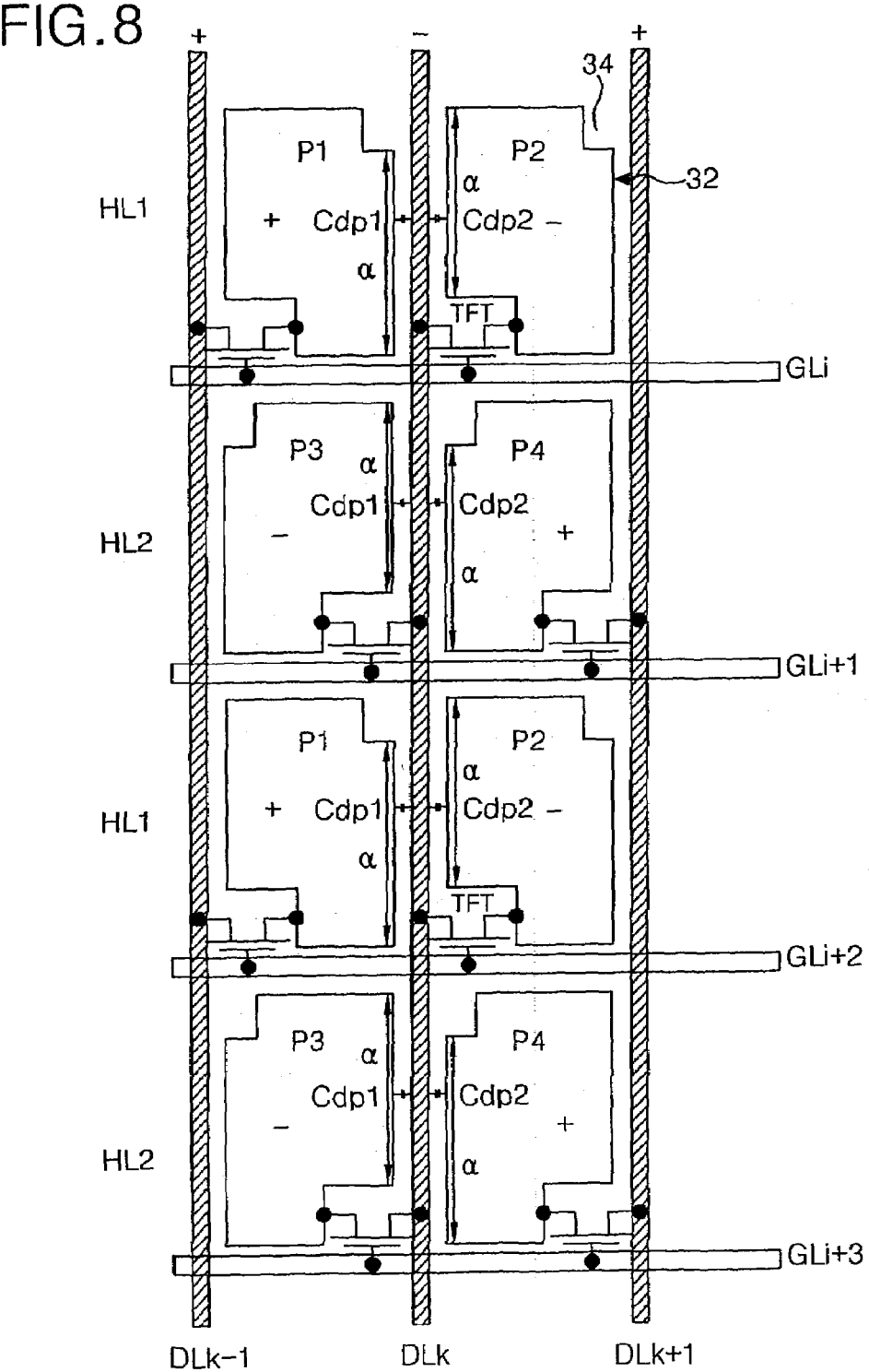

LIQUID CRYSTAL DISPLAY PANEL AND METHOD OF MAKING THE SAME

This application claims the benefit of the Korean Patent Application No. P2002-69690 filed on Nov. 11, 2002, which is hereby incorporated by reference for all purposes as if fully set forth herein.

BACKGROUND OF THE INVENTION

1. Field of the Invention

The present invention relates to a liquid crystal display panel, and more particularly, to a liquid crystal display panel capable of improving a picture quality and reducing power dissipation.

2. Description of the Related Art

Generally, liquid crystal displays (LCDs) control light transmittance characteristics of liquid crystal material using electric fields to display pictures. Accordingly, LCDs typically include an LCD panel having a plurality of liquid crystal cells arranged in a matrix pattern and a drive circuit for driving the LCD panel.

The LCD panel includes a plurality of gate lines and a plurality of data lines arranged so as to cross one another, wherein the liquid crystal cells are defined by the gate and data lines. The liquid crystal display panel is further provided with a common electrode and a plurality of pixel electrodes for applying the electric fields to the plurality of liquid crystal cells to display pictures. The drive circuit includes a gate driver for driving the plurality of gate lines, a data driver driving the plurality of data lines, a timing controller for applying timing control signals and pixel data to the gate and data drivers, respectively, and a power supply for applying power voltage.

FIG. 1 illustrates a related art a liquid crystal display.

Referring to FIG. 1, the LCD includes an LCD panel 2 having a plurality of liquid crystal cells (Clc) arranged in a matrix pattern; a gate driver 4 for driving a plurality of gate lines GL1 to GLn within the liquid crystal display panel; and a data driver 6 for driving a plurality of data lines DL1 to DLm within the liquid crystal display panel 2.

The liquid crystal display panel 2 generally includes a plurality of thin film transistors (TFTs) arranged, similar to the liquid crystal cells Clc, in a matrix pattern at crossings of the gate lines GL1 to GLn and data lines DL1 to DLm. The TFTs apply pixel signals from the data lines DL1 to DLm to the liquid crystal cells Clc in response to scan signals applied from the gate lines GL1 to GLn. The liquid crystal cell (Clc) includes a pixel electrode connected to the thin film transistor and facing a common electrode, wherein the liquid crystal material is provided therebetween. The liquid crystal cell can be equivalently expressed as a liquid crystal capacitor.

The gate driver 4 generates scan signals and sequentially applies the scan signals to the gate lines GL1 to GLn in response to gate control signals outputted from a timing controller 8.

The data driver 6 converts digital pixel data outputted from the timing controller 8 into analog pixel signals in response to data control signals outputted from the timing controller 8. Further, the data driver 6 converts the digital pixel data into analog pixel signals using gamma voltages applied from a gamma voltage generator (not shown). Still further, the data driver 6 applies the analog pixel signals to the data lines DL1 to DLm whenever the scan signal is applied to any of the gate lines GL.

The gate control signals and data control signals generated by the timing controller 8 are used as vertical synchronization signals and horizontal synchronization signals to control the timing of the gate driver 4 and data driver 6. Further, the timing controller 8 receives and aligns externally inputted pixel data and outputs the aligned pixel data to the data driver 6.

Typically, liquid crystal display panels are driven according to an inversion driving method (e.g., a frame inversion method, a line (or column) inversion method, and a dot inversion method) to improve display quality as well as to prevent liquid crystal material from deteriorating.

Figures 2A, 2B:
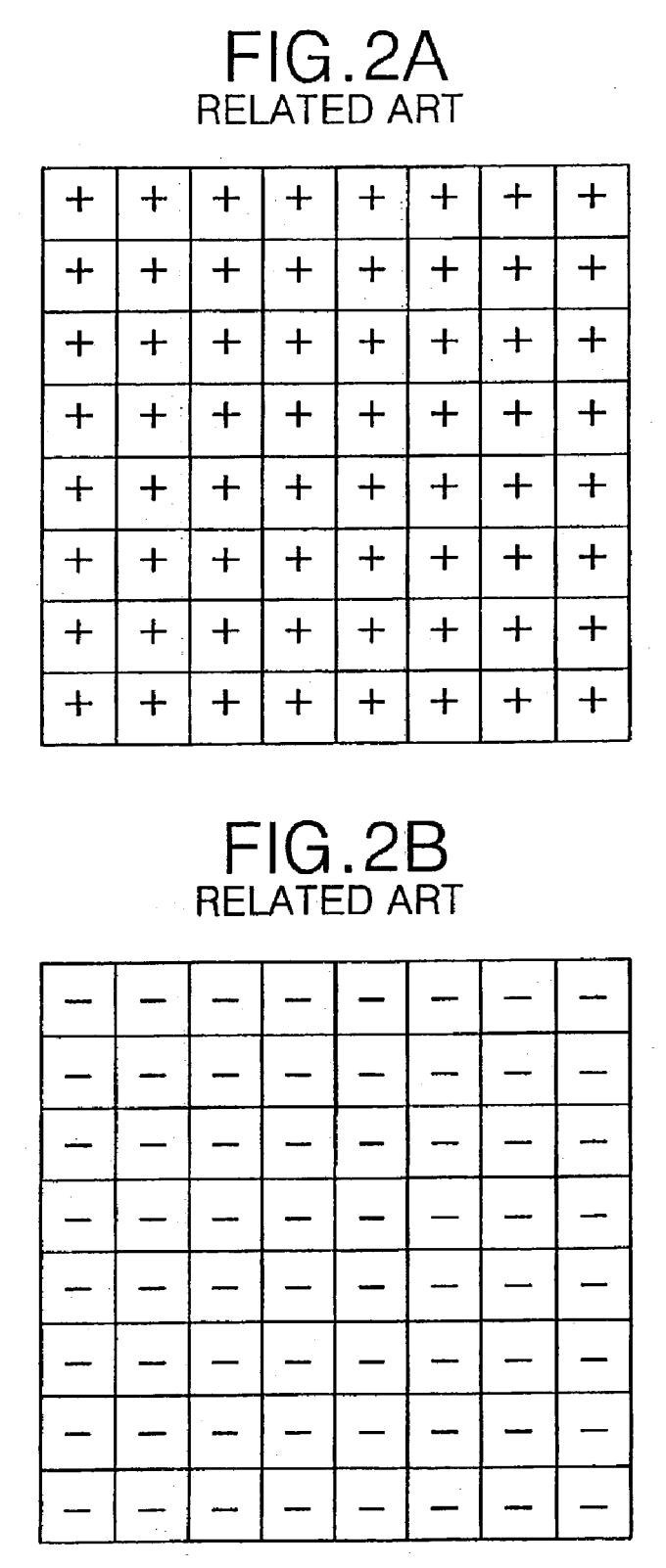

FIGS. 2A and 2B illustrate a method of driving a liquid crystal panel display according to a frame inversion method.

Referring to FIGS. 2A and 2B, upon driving the LCD panel according to the frame inversion method, the polarity of all the liquid crystal cells within the LCD is identical and is inverted between frames. Driving the LCD panel according to the frame inversion driving method is problematic in that a flicker occurs between each frame.

Figures 3A, 3B:
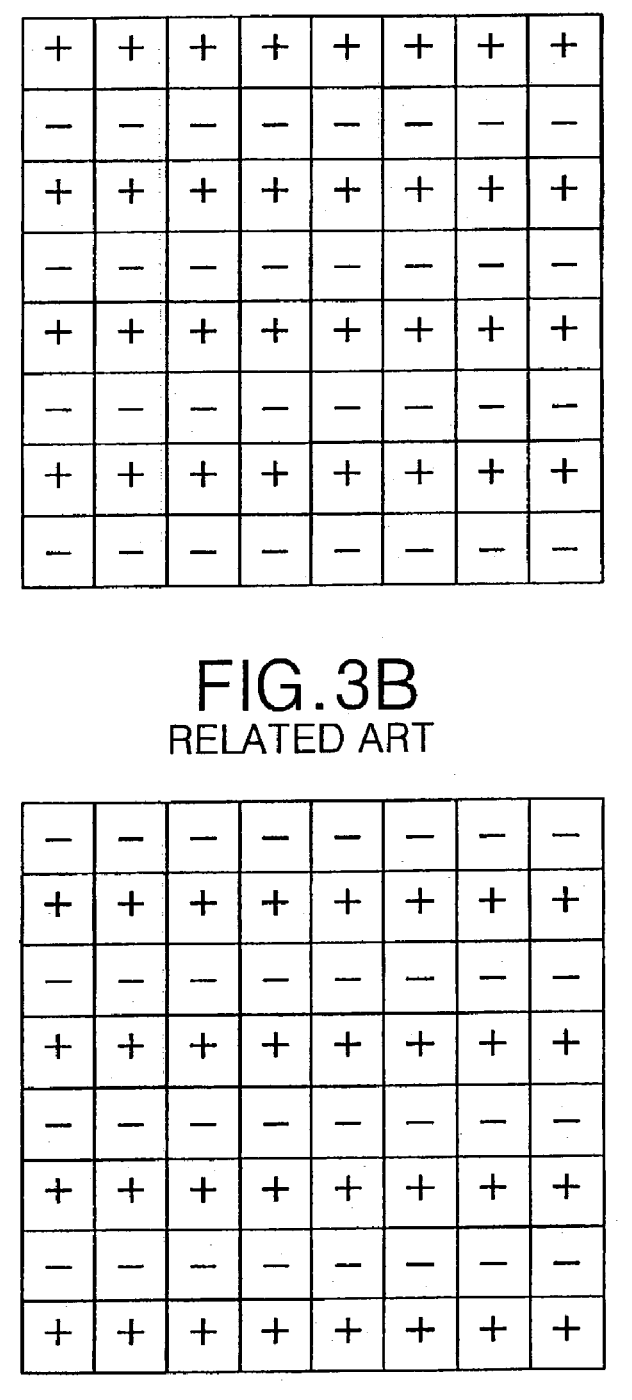

FIGS. 3A and 3B illustrate a method of driving a liquid crystal panel display according to a line inversion method.

Referring to FIGS. 3A and 3B, upon driving the LCD panel according to the line inversion method, the polarity of liquid crystal cells within a horizontal line is identical, wherein polarities of adjacent ones of horizontal lines of liquid crystal cells are opposite, and wherein the polarities of the liquid crystal cells are inverted between frames. Driving the LCD panel according to the line inversion method is problematic in that a flicker occurs, generating a horizontal stripe pattern due to the crosstalk phenomenon between adjacent horizontal lines of the liquid crystal cells.

Figures 4A, 4B:
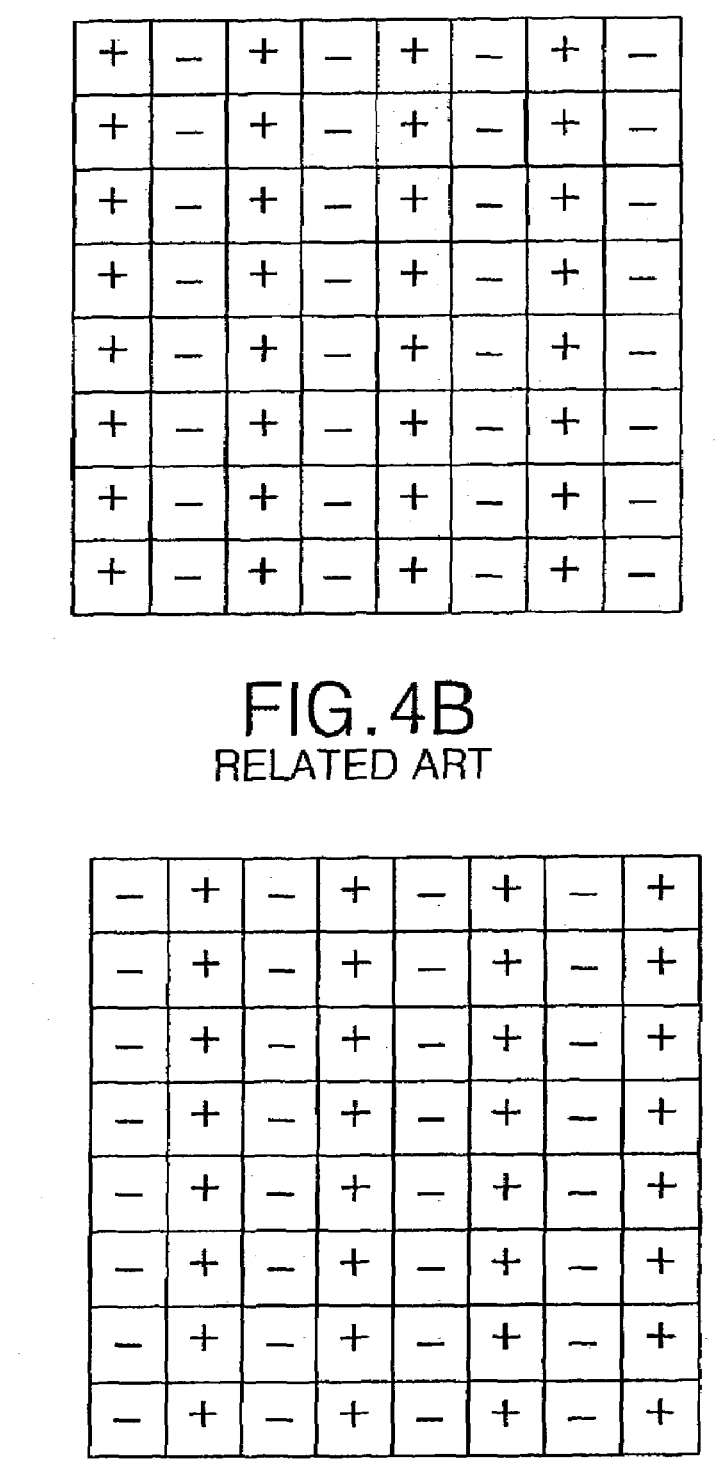

FIGS. 4A and 4B illustrate a method of driving a liquid crystal panel display according to a column inversion method.

Referring to FIGS. 4A and 4B, upon driving the LCD panel according to the column inversion method, the polarity of liquid crystal cells within a vertical line is identical, wherein polarities of adjacent ones of vertical lines of liquid crystal cells are opposite, and wherein the polarities of the liquid crystal cells are inverted between frames. Driving the LCD panel according to the column inversion method is problematic in that a flicker occurs, generating a vertical stripe pattern due to the crosstalk phenomenon between adjacent vertical lines of liquid crystal cells.

Figures 5A, 5B:
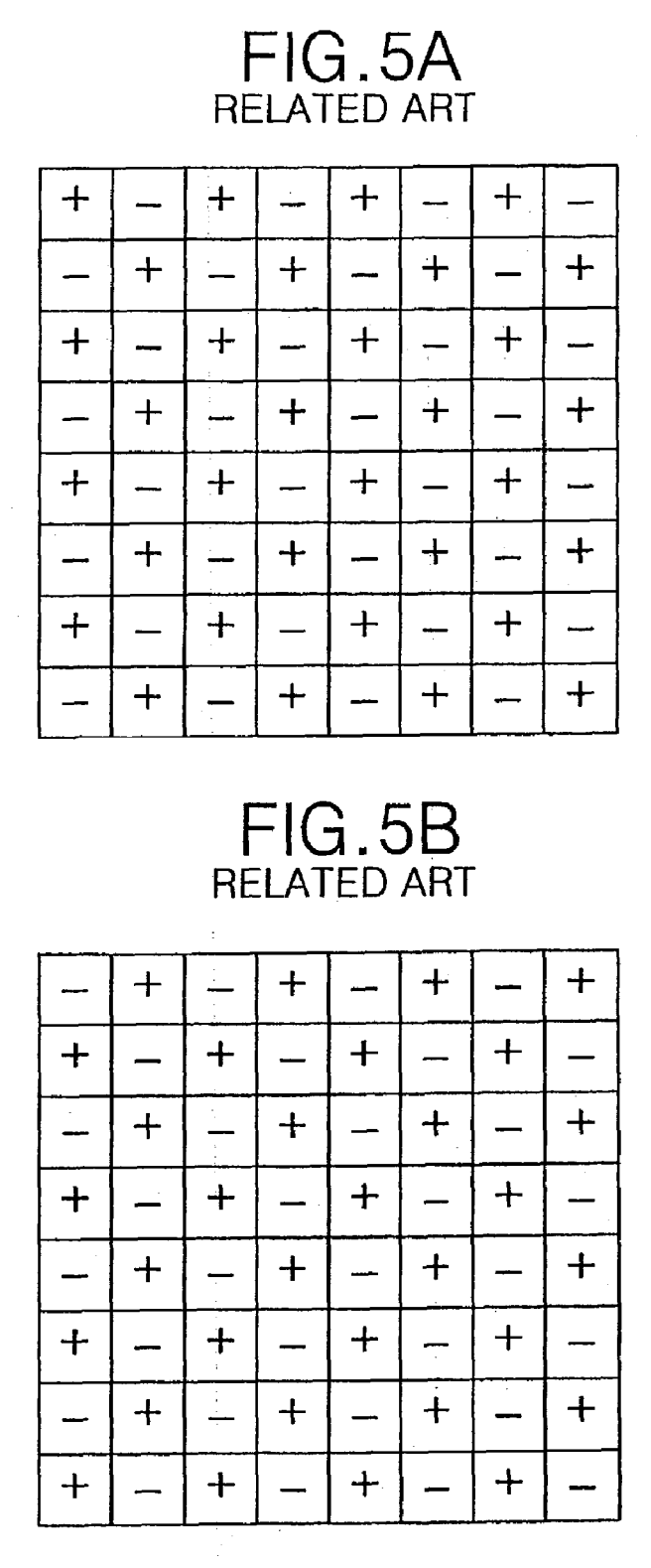

FIGS. 5A and 5B illustrate a method of driving a liquid crystal display panel according to a dot inversion method.

Referring to FIGS. 5A and 5B, upon driving the LCD panel according to the dot inversion method, the polarities of horizontally and vertically adjacent ones of the liquid crystal cells are opposite each other and are inverted between frames. Driving the LCD panel according to the dot inversion method may improve the picture quality of the LCD panels over the picture quality of LCD panels driven according to the other inversion methods because, when applying the dot inversion method, flicker occurs in both horizontal and vertical directions and therefore offset each other.

In driving the LCD panel according to the dot inversion method, the polarities of the analog pixel voltage signals applied from the data driver to the data lines are inverted in horizontal and vertical directions. Accordingly, driving the LCD panel according to the dot inversion method is disadvantageous because a fluctuation amount of the applied analog pixel signal (i.e., the frequency of the analog pixel signal) is greater than a fluctuation amount of the applied analog pixel signal in other inversion methods. Due to the large fluctuation amount of the applied analog pixel signal, power dissipation of the LCD panel is excessively high.

SUMMARY OF THE INVENTION

Accordingly, the present invention is directed to a liquid crystal display panel that substantially obviates one or more of the problems due to limitations and disadvantages of the related art.

An advantage of the present invention provides a liquid crystal display panel capable of improving picture quality and reducing power dissipation.

Additional features and advantages of the invention will be set forth in the description which follows, and in part will be apparent from the description, or may be learned by practice of the invention. These and other advantages of the invention will be realized and attained by the structure particularly pointed out in the written description and claims hereof as well as the appended drawings.

To achieve these and other advantages and in accordance with the purpose of the present invention, as embodied and broadly described, a liquid crystal display panel according to an aspect of the present invention may, for example, include liquid crystal cells arranged in a matrix pattern and each having a thin film transistor formed at a crossing of gate lines and date lines and having a pixel electrode connected to the thin film transistor; a first parasitic capacitor formed between the data line and an adjacent pixel electrode to the left of the data line; a second parasitic capacitor formed between the data line and an adjacent pixel electrode to the right of the data line; and a groove formed at one of the adjacent pixel electrodes, wherein the groove is adjacent the data line.

In another aspect of the present invention, the liquid crystal cells may, for example, include a first horizontal line of liquid crystal cells connected to one another via thin film transistors and data lines adjacent to the left of the liquid crystal cells within the first horizontal line; and a second horizontal line of liquid crystal cells connected to one another via thin film transistors and data lines adjacent to the right of the liquid crystal cells within the second horizontal line.

The groove may be formed within a portion of pixel electrodes adjacent the data line and opposite a side portion of the pixel electrode coupled to a TFT.

Within the first horizontal line, pixel electrodes may be coupled to preceding ones of adjacent data lines, wherein polarities of pixel signals applied to consecutively arranged data lines may be inverted.

Within the second horizontal line, pixel electrodes may be coupled to successive ones of adjacent data lines, wherein polarities of pixel signals applied to consecutively arranged data lines may be inverted.

A side length of a portion of a pixel electrode including the groove facing the data line may be substantially the same as a side length of a portion of a pixel electrode not including a groove facing the data line.

The groove may be formed to minimize a parasitic capacitance deviation between the first parasitic capacitor and the second parasitic capacitor.

An arrangement of the first and second horizontal lines HL1 and HL2 may be repeated a predetermined number of times such that within a vertical line of liquid crystal cells, every other liquid crystal cell is a liquid crystal cell from the first horizontal line HL1 (and every other liquid crystal cell is a liquid crystal cell from the second horizontal line HL2).

In another aspect of the present invention, a liquid crystal display panel, comprises a plurality of consecutively arranged, substantially parallel data lines; and a plurality of pixel electrodes arranged in a matrix pattern adjacent the plurality of data lines, wherein a parasitic capacitance at side portions of the plurality of pixel electrodes adjacent the plurality of data lines is substantially equal.

In another aspect of the present invention, a method of making a liquid crystal display panel, comprises forming a plurality of consecutively arranged, substantially parallel data lines; and forming a plurality of pixel electrodes arranged in a matrix pattern adjacent the plurality of data lines, wherein a parasitic capacitance at side portions of the plurality of pixel electrodes adjacent the plurality of data lines is substantially equal.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings:

FIGS. 2A and 2B illustrate a method of driving a liquid crystal display panel according to a frame inversion method;

FIGS. 3A and 3B illustrate a method of driving a liquid crystal display panel according to a line inversion method;

FIGS. 4A and 4B illustrate a method of driving a liquid crystal display panel according to a column inversion method;

FIGS. 5A and 5B illustrate a method of driving a liquid crystal display panel according to a dot inversion method;

FIG. 8 illustrates a portion of a liquid crystal display panel according to the principles of the present invention.

DETAILED DESCRIPTION OF THE ILLUSTRATED EMBODIMENT

Reference will now be made in detail to embodiments of the present invention, examples of which are illustrated in the accompanying drawings.

In one aspect of the present invention, a liquid crystal display panel may be driven according to a dot inversion method to improve picture quality as well as to prevent deterioration of liquid crystal material upon driving liquid crystal cells using alternating current (AC) voltage. Accordingly, the dot inversion method must invert the polarity of a pixel signal for every liquid crystal cell within the liquid crystal display panel. As mentioned above, such inversion of polarity results in increasing the fluctuation amount of the pixel signal and high power dissipation in the related art liquid crystal display panels. To alleviate the aforementioned related art problem of the high power dissipation induced by dot inversion methods, the Applicant of the present invention proposed, in Korean Patent Application No. 2002-37740, a liquid crystal display and a driving method thereof capable of driving liquid crystal cells according to the dot inversion method while driving data lines according to a column inversion method.

Figure 1:
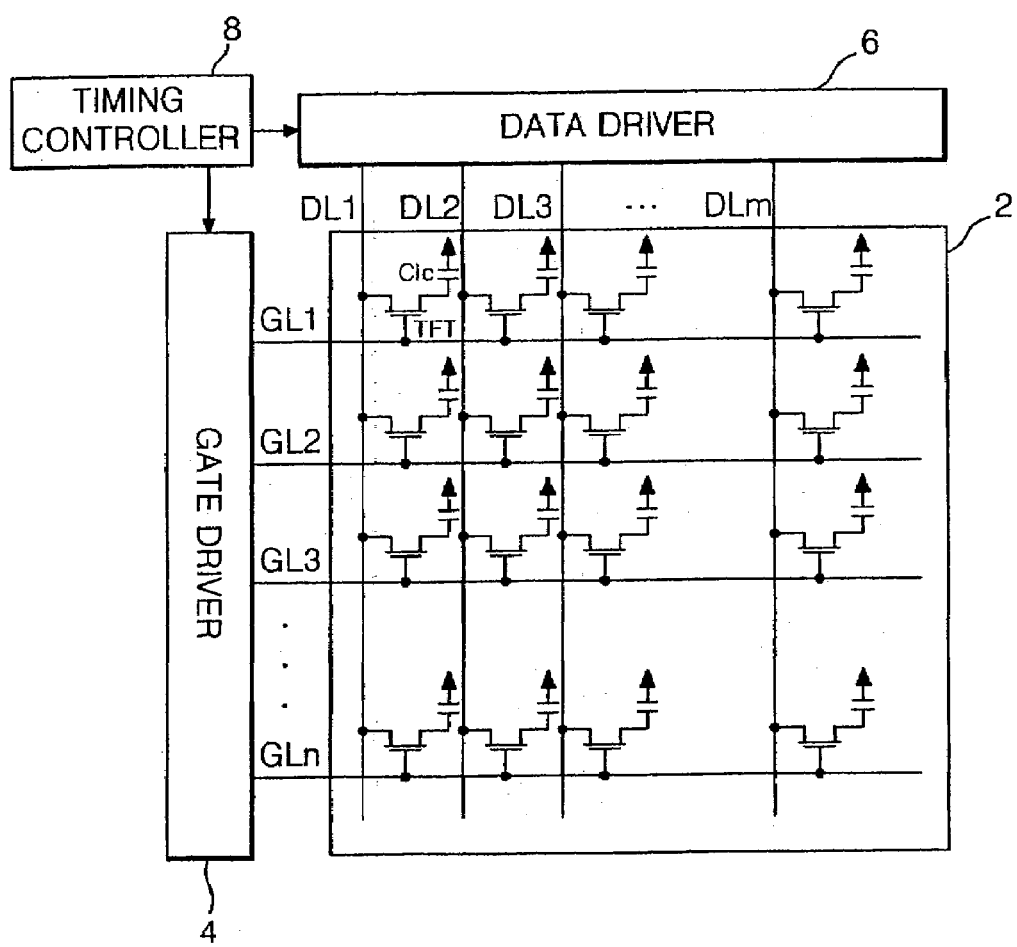
FIG. 1 illustrates a related art a liquid crystal display.
Figure 6:
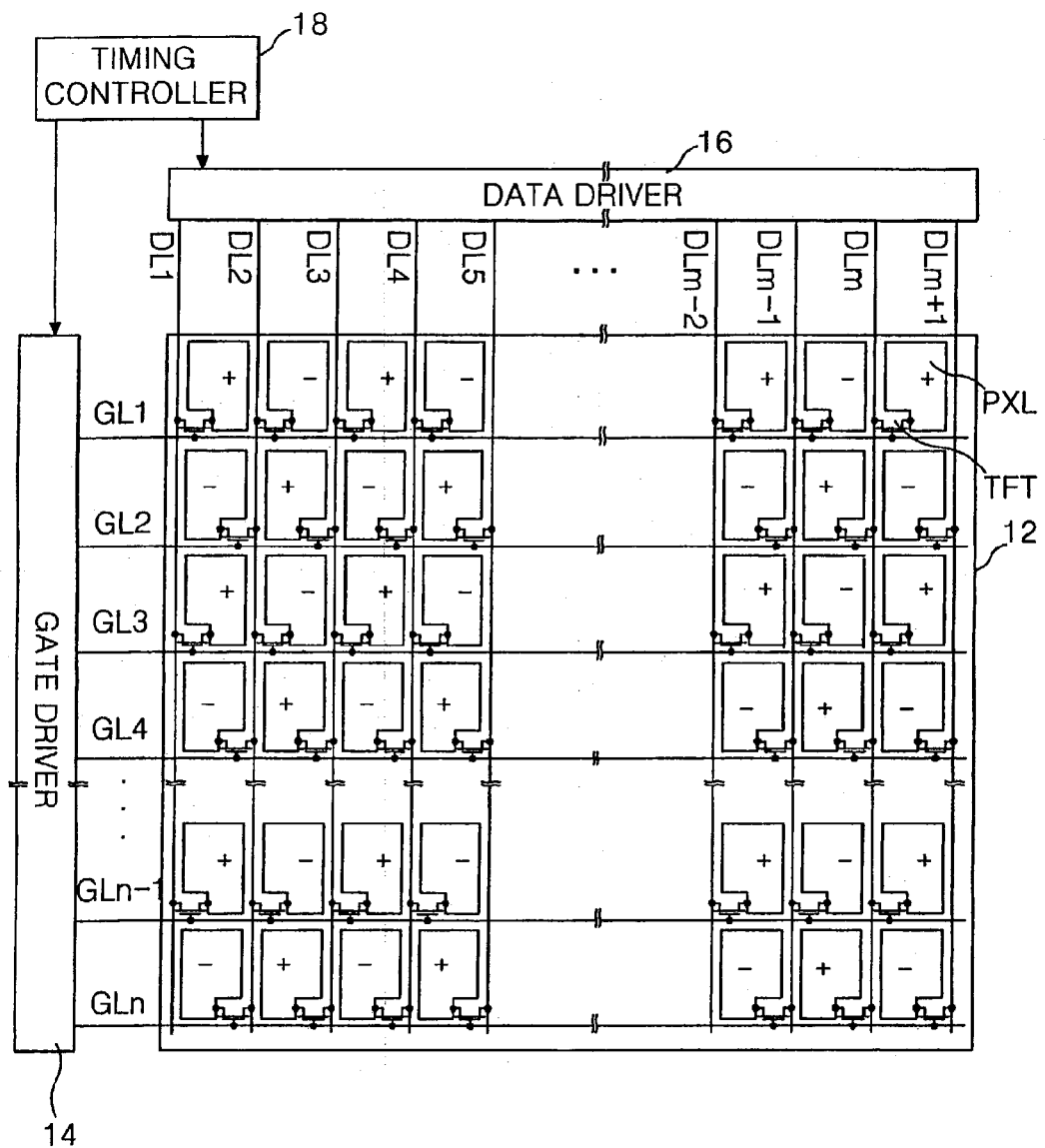
FIG. 6 illustrates a related art liquid crystal display.

FIG. 6 illustrates a liquid crystal display (hereinafter, "Z-inversion liquid crystal display") proposed in the Korean Patent Application No. 2002-37740.

FIG. 6 illustrates the related art liquid crystal display proposed in the aforementioned Korean Patent Application No. 2002-37740.

Referring to FIG. 6, the liquid crystal display includes a liquid crystal display panel 12 having a plurality of liquid crystal cells arranged in a matrix pattern; a gate driver 14 for driving gate lines GL1 to GLn within the liquid crystal display panel 12; a data driver 16 for driving data lines DL1 to DLm+1 within the liquid crystal display panel 12; and a timing controller 18 for controlling the gate driver 14 and the data driver 16.

The liquid crystal display panel 12 further includes a lower substrate for supporting the gate lines GL1 to GLn and data lines DL1 to DLm+1 crossing the gate lines to define a plurality of liquid crystal cells. A plurality of thin film transistor TFT are formed at crossings of the gate and data lines GL and DL, respectively, and a pixel electrode PXL is formed within each of the liquid crystal cells. The thin film transistors (TFTs) apply pixel signals from the data lines DL1 to DLm+1 to corresponding ones of the pixel electrodes PXL in response to a scan signal applied from a corresponding gate line GL. The pixel electrode PXL controls the light transmittance characteristics of the liquid crystal material between a common electrode (not shown) and the pixel electrode PXL within the liquid crystal cell, in response to the pixel signal. Consecutive ones of liquid crystal cells arranged within a vertical column are alternately connected to adjacent ones of the data lines DL, wherein successively arranged data lines DL apply pixel signals of opposite polarity.

For example, liquid crystal cells within odd-numbered horizontal lines (i.e., liquid crystal cells including TFTs connected to odd-numbered gate lines GL1, GL3, GL5, etc.) are connected to preceding ones of adjacent data lines DLi (hereinafter, i is a positive integer). However, the liquid crystal cells within even-numbered horizontal lines (i.e., liquid crystal cells including TFTs connected to an even-numbered gate lines GL2, GL4, GL6, etc.) are connected to successive ones of adjacent data lines DLi+1.

The timing controller 18 generates timing control signals for controlling the gate driver 14 and the data driver 16, and applies pixel data signals to the data driver 16. Gate timing control signals generated by the timing controller 18 include a gate start pulse GSP, a gate shift clock signal GSC, and a gate output enable signal GOE. Data timing control signals generated in the timing controller 18 includes a source start pulse SSP, a source shift clock signal SSC, a source output enable signal SOE, and a polarity control signal POL.

The gate driver 14 sequentially applies scan signals to the gate lines GL1 to GLn using the gate timing control signals. Accordingly, the gate driver 14 drives the thin film transistors TFT one horizontal line at a time.

The data driver 16 converts inputted digital pixel data into analog pixel signals and applies analog pixel signals corresponding to a scanned horizontal line to the data lines DL1 to DLm+1 during each horizontal period when a scan signal is applied to a gate line GL. Further, the data driver 16 converts the digital pixel data to the analog pixel signals using gamma voltages applied from a gamma voltage generator (not shown).

The data driver 16 applies the analog pixel signals according to a column inversion system, such that analog pixel signals applied to adjacent ones of the data lines DL1 to DLm+1 are opposite in polarity to each other, wherein the polarity of the analog pixel signals are inverted between each frame. Accordingly, during any frame, analog pixel signals applied to the odd-numbered data lines DL1, DL3, etc., may all be positive (or all negative) while analog pixel signals applied to the even-numbered data lines DL2, DL4, etc., may all be negative (or all positive).

Applying the aforementioned related art inversion scheme, pixel electrodes PXL of liquid crystal cells including TFTs connected to a common data line DL are arranged in a zigzag-type pattern and are driven according to a column inversion method while the liquid crystal cells of the liquid crystal display panel appear to be driven according to a dot inversion method.

Specifically, the data driver 16 alternately changes an output channel of the analog pixel signal during each horizontal period to apply analog pixel signals having correct polarities to the pixel electrodes PXL, arranged in a zigzag-type pattern about common data lines DL. When analog pixel signals are applied to liquid crystal cells connected to the right of adjacent ones of data lines DL1 to DLm+1, the data driver 16 applies m number of effective analog pixel signals to the first to $m^{th}$ data lines DL1 to DLm and a blank signal to the $(m+1)^{th}$ data line DLm+1. When analog pixel signals are applied to liquid crystal cells connected to the left of adjacent ones of the data lines DL1 to DLm+1, the data driver 16 shifts the m number of effective analog pixel signals to the right by one channel and applies the shifted pixel signals to the second to the $(m+1)^{th}$ data lines DL2 to DLm+1 and a blank signal is applied to the first data line DL1.

The related art liquid crystal display shown in FIG. 6 may have an improved picture quality by driving the liquid crystal cells according to the dot inversion method while and the data driver 16 applies the analog pixel signals having polarities that are inverted according to the column inversion method. Accordingly, power dissipation can be remarkably reduced compared to power dissipation of related art liquid crystal displays driven by applying analog pixel signals having polarities inverted according to the dot inversion method.

However, within the related art liquid crystal display shown in FIG. 6, a parasitic capacitance deviation between parasitic capacitors is formed between data lines DL and adjacent pixel electrodes provided to the right and left of the data lines. The parasitic capacitance differential or deviation exists because the areas where the parasitic capacitor is formed (i.e., between data lines DL and adjacent pixel electrodes provided to the right and left of the data lines) are different from each other.

Figure 7:
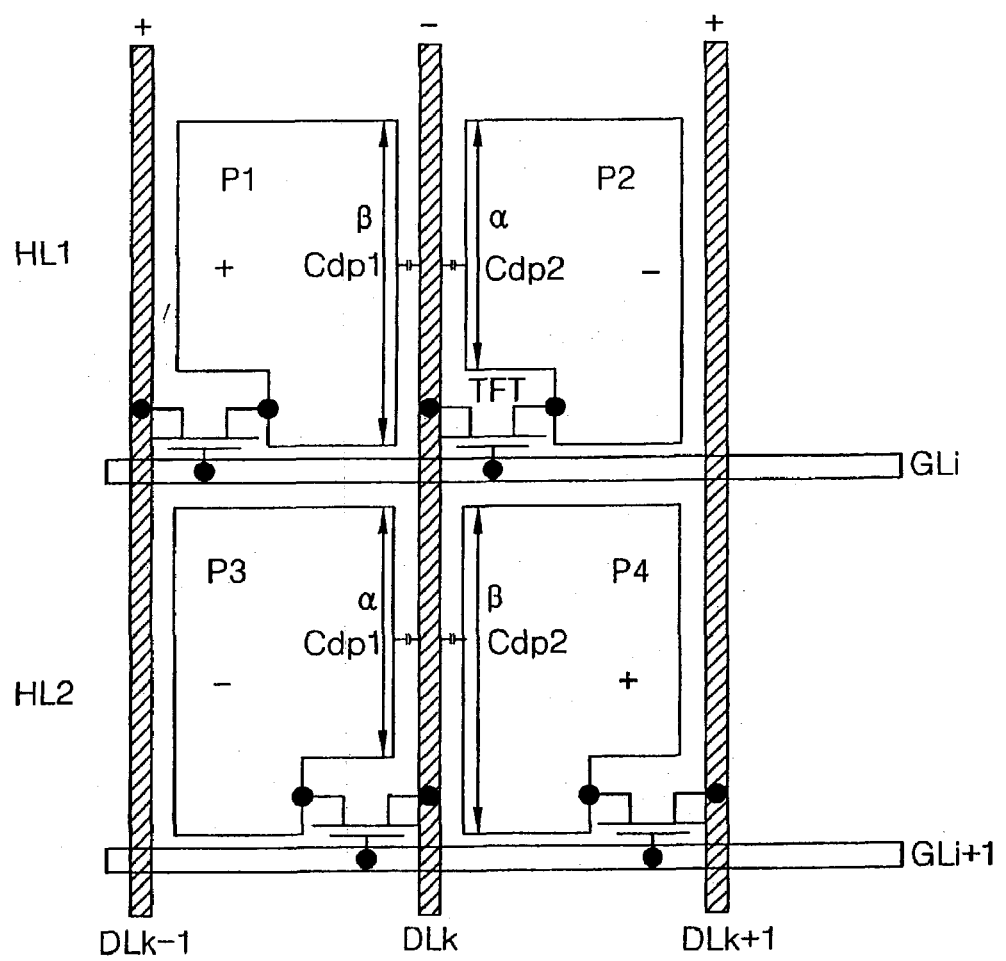
FIG. 7 illustrates the development of crosstalk in the related liquid crystal display panel shown in FIG. 6.

For example, and referring now to FIG. 7, a parasitic capacitor (Cdp) formed between any given data line DL and the adjacent ones of the pixel electrodes provided to the right and left of the given data line DL may consist of a first parasitic capacitor Cdp1 and a second parasitic capacitor Cdp2. The first parasitic capacitor Cdp1 may be formed between a data line DLk and a left adjacent pixel electrode P1 (or P3) while the second parasitic capacitor Cdp2 may be formed between the data line DLk and a right adjacent pixel electrode P2 (or P4). As can be seen from the Figure, the parasitic capacitances of the first and second parasitic capacitors Cdp1 and Cdp2 are not equal because their areas are not equal.

More specifically, a first parasitic capacitance of the first parasitic capacitor Cdp1 is greater than a second parasitic capacitance of the second parasitic capacitor Cdp2 within a first horizontal line HL1 of liquid crystal cells including TFTs connecting preceding ones of adjacent data lines DLk−1, DLk to pixel electrodes P1 and P2 and driven by the $i^{th}$ gate line GLi. Within the first horizontal line HL1, the first parasitic capacitance is greater because a side length β of a first pixel electrode P1 facing the data line DLk is greater than a side length α of a second pixel electrode P2 facing the data line DLk. Therefore, the area of the first pixel electrode P1, forming the first parasitic capacitor Cdp1 with the data line DLk, is greater than the area of the second pixel electrode P2, forming the second parasitic capacitor Cdp2 with the data line DLk. Accordingly, a parasitic capacitance deviation between the first parasitic capacitor Cdp1 and the second parasitic capacitor Cdp2 is proportional to the area of the parasitic capacitor which, in turn is proportional to the length of the pixel electrode facing an adjacent data line.

Further, the second parasitic capacitance of the second parasitic capacitor Cdp2 is greater than the first capacitance of the first parasitic capacitor Cdp1 within a second horizontal line HL2 of liquid crystal cells including TFTs connecting successive ones of the adjacent data lines DLk, DLk+1 to pixel electrodes P3 and P4 and driven by the $i+1^{th}$ gate line GLi+1. Within the second horizontal line HL2, the second parasitic capacitance is greater because the side length β of the fourth pixel electrode P4 facing the data line DLk is greater than the side length α of the third pixel electrode P3 facing the data line DLk. Therefore, the area of the fourth pixel electrode P4 forming the second parasitic capacitor Cdp2 with the data line DLk is greater than the area of the third pixel electrode P3 forming the first parasitic capacitor Cdp1 with the data line DLk. Accordingly, a parasitic capacitance deviation between the second parasitic capacitor Cdp2 and the first parasitic capacitor Cdp1 is proportional to the area of the parasitic capacitor which, in turn is proportional to the length of the pixel electrode facing an adjacent data line.

Due to the parasitic capacitance deviation between the first and second parasitic capacitors Cdp1 and Cdp2, the analog pixel signal in the data line DL becomes distorted. The distorted analog pixel signal then deleteriously becomes charged within the pixel and, as a result, when displaying a crosstalk test pattern within an area of the related art liquid crystal display shown in FIG. 6, the parasitic capacitance deviation induces vertical crosstalk between adjacent ones of vertical lines of liquid crystal cells, thereby deteriorating the picture quality.

Further, the data lines DL and the pixel electrodes P shown in FIG. 7 are typically spaced a predetermined distance apart from each other to decrease a value of the parasitic capacitance of the parasitic capacitor Cdp. Accordingly, leakage of light emitted by a backlight (not shown) may occur between the data lines DL and the pixel electrodes P when the liquid crystal cells are not driven. Moreover, spaces defined by the first and second parasitic capacitors Cdp1 and Cdp2 are different from each other, accordingly the amount of light that "leaks" through the space defined by the first and second parasitic capacitors Cdp1 and Cdp2 is unequal. Within the first horizontal line HL1, for example, the amount of light that leaks through the space defined by the first parasitic capacitor Cdp1, the capacitance of which is relatively large, is greater than the amount of light that leaks through the space defined by the second parasitic capacitor Cdp2, the capacitance of which is relatively low. Since the aforementioned leakage of light is substantially asymmetric, light leakage caused by the first and second parasitic capacitors may be generated within horizontal lines of liquid crystal cells and the picture quality again becomes deteriorated.

In order to prevent both vertical cross talk and asymmetric light leakage caused by the aforementioned parasitic capacitance deviation generated in the related art liquid crystal display shown in FIG. 6, the liquid crystal display panel according to the principles of the present invention may be designed such that the first and second parasitic capacitors Cdp1 and Cdp2, respectively, have substantially the same parasitic capacitance for a given data line DL. In one aspect of the present invention, the pixel electrode P may be provided such that the first and second parasitic capacitors Cdp1 and Cdp2 will have substantially the same parasitic capacitance.

FIG. 8 illustrates a portion of a liquid crystal display panel according to the principles of the present invention.

Referring to FIG. 8, the liquid crystal display panel according to the principles of the present invention may, for example, include liquid crystal cells 32 arranged in a matrix pattern and formed at crossings of the gate lines GL and data lines DL. Each liquid crystal cell 32 may include a thin film transistor TFT and a pixel electrode P. Each thin film transistor TFT may apply a pixel signal applied by a corresponding data line DL to the pixel electrode P in response to a scan signal applied by a corresponding gate line GL. Each pixel electrode P may drive liquid crystal material provided between the pixel electrode P and a common electrode (not shown) in response to the applied pixel signal. Accordingly, the liquid crystal cell 32 may control the light transmittance characteristics of the liquid crystal material by driving the liquid crystal material within the liquid crystal cells to display a picture.

According to the principles of the present invention, consecutive ones of liquid crystal cells 32 arranged within a vertical line may be alternately connected to adjacent ones of the data lines DLk−1, DLk, DLk+1, and successively arranged data lines DL may apply pixel signals of opposite polarity to drive a liquid crystal display according to an inversion driving method. In one aspect of the present invention, the liquid crystal display panel may include a first horizontal line HL1 of a plurality of liquid crystal cells 32 including TFTs connected to preceding ones of adjacent data lines DLk−1, DLk, and a second horizontal line HL2 of a plurality of liquid crystal cells 32 connected to successive ones of adjacent data lines DLk, DLk+1. In another aspect of the present invention, arrangement of the first and second horizontal lines HL1 and HL2 may be repeated a predetermined number of times such that within a vertical line of liquid crystal cells, every other liquid crystal cell is a liquid crystal cell from the first horizontal line HL1 (and every other liquid crystal cell is a liquid crystal cell from the second horizontal line HL2). In yet another aspect of the present invention, arrangement of the first and second horizontal lines HL1 and HL2 may be repeated a predetermined number of times such that within a vertical line of liquid crystal cells, every two liquid crystal cells are liquid crystal cells from the first horizontal line HL1 (and every two liquid crystal cells are liquid crystal cells from the second horizontal line HL2).

According to the principles of the present invention, a parasitic capacitor Cdp exists between the data lines DL and each adjacent pixel electrode P. The parasitic capacitor Cdp may include a first parasitic capacitor Cdp1 and a second parasitic capacitor Cdp2. In one aspect of the present invention, the first parasitic capacitor may be formed between a data line DL, an adjacent pixel electrode P preceding the data line DL, and a protective film (not shown) formed between the data line DL and the adjacent pixel electrode P. In another aspect of the present invention, the second parasitic capacitor Cdp2 may be formed between the data line DL, an adjacent successive pixel electrode P, and the protective film (not shown) formed therebetween. In order to prevent a parasitic capacitance differential between the first and second parasitic capacitors Cdp1 and Cdp2, respectively, the first and second parasitic capacitors Cdp1 and Cdp2 are formed to have the same or substantially the same parasitic capacitance. Accordingly, a groove 34 may be formed within the side of the pixel electrode P adjacent the data line and opposing the side of the pixel electrode P coupled to the TFT, thereby reducing the parasitic capacitance of the parasitic capacitor. Instead of a groove 34 as shown in FIG. 8, a suitable cutout portion may be formed to reduce the area to minimize the capacitance differential.

For example, as shown in FIG. 8, within the first horizontal line HL1, the preceding pixel electrode P1 forming the first parasitic capacitor Cdp1 may, for example, include a groove 34 formed within the side adjacent data line DLk and opposite the side of the pixel electrode P1 coupled to the TFT. Accordingly, the capacitance of the first parasitic capacitor Cdp1 between the data line DLk and the preceding pixel electrode P1 may be reduced compared to the first pixel electrode P1 shown in FIG. 7. Consequently, the parasitic capacitance deviation between the first parasitic capacitor Cpd1 and the second parasitic capacitor Cdp2, formed between the data line DLk and the successive pixel electrode P2, may be minimized. Therefore, within the first horizontal line HL1, the parasitic capacitance deviation between the first and second parasitic capacitors Cdp1 and Cdp2 can also be minimized. According to the principles of the present invention, the location of the groove 34 may be formed in any portion (e.g., an upper portion, lower power, middle portion, etc.) of the preceding pixel electrode P1 adjacent the data line DLk and opposite the side of the pixel electrode P1 coupled to the TFT.

Still referring to FIG. 8, within the second horizontal line HL2, the successive pixel electrode P4 forming the second parasitic capacitor Cdp2 may, for example, include a groove 34 formed within the side of adjacent data line DLk and opposite the side of the pixel electrode P4 coupled to the TFT. Accordingly, the capacitance of the second parasitic capacitor Cdp2 between the data line DLk and the successive pixel electrode P4 may be reduced compared to the fourth pixel electrode P4 shown in FIG. 7. Consequently, the parasitic capacitance deviation between the second parasitic capacitor Cpd2 and the first parasitic capacitor Cdp1, formed between the data line DLk and the preceding pixel electrode P3, may be minimized. Therefore, within the second horizontal line HL2, the parasitic capacitance deviation between the first and second parasitic capacitors Cdp1 and Cdp2 can also be minimized. According to the principles of the present invention, the location of the groove 34 may be formed in any portion (e.g., an upper portion, lower power, middle portion, etc.) of the successive pixel electrode P4 adjacent the data line DLk and opposite the side of the pixel electrode P4 coupled to the TFT.

The liquid crystal display panel shown in FIG. 8 may reduce the area of the pixel electrode that forms the parasitic capacitor with the historically high capacitance with the data line DL, as taught by the related art shown in FIG. 7. Accordingly, the parasitic capacitance deviation between the first and second parasitic capacitors Cdp1 and Cdp2 formed between the data line and the adjacent preceding and successive pixel electrodes P can be minimized. Accordingly, the aforementioned vertical crosstalk and asymmetric light leakage caused by the parasitic capacitance differential between the first and second parasitic capacitors Cdp1 and Cdp2 can be prevented to improve picture quality of a liquid crystal display.

The liquid crystal display panel according to the present invention may include a plurality of gate lines, a plurality of data lines crossing the plurality of gate lines, a plurality of liquid crystal cells defined by the crossing of the gate and data lines and arranged in a matrix pattern. Liquid crystal cells successively arranged within a vertical line may include pixel electrodes electrically coupled to TFTs, where the TFTs are alternately connected to adjacent ones of the data lines. Further, a groove may be formed in a portion of the pixel electrode adjacent a data line and opposite a side of the pixel electrode coupled to the TFT to minimize the parasitic capacitance deviation between the first and second parasitic capacitors Cdp1 and Cdp2 formed between the data line and adjacent ones of the preceding and successive pixel electrodes. Accordingly, the liquid crystal display panel according to the present invention can minimize vertical crosstalk and asymmetric light leakage caused by the parasitic capacitance deviation between the first and second parasitic capacitors Cdp1 and Cdp2, thereby improving picture quality.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. A liquid crystal display panel, comprising:
   a plurality of gate lines;
   a plurality of data lines crossing the plurality of gate lines;
   a plurality of liquid crystal cells defined by the gate and data lines, wherein each liquid crystal cell comprises a thin film transistor at a crossing of the gate and data lines, and a pixel electrode connected to the thin film transistor at a first side portion, wherein the liquid crystal cells include a first horizontal line of liquid crystal cells having thin film transistors connected to preceding ones of adjacent data lines, and a second horizontal line of liquid crystal cells having thin film transistors connected to successive ones of adjacent data lines;
   a first parasitic capacitor formed between the plurality of data lines and pixel electrodes preceding adjacent ones of the plurality of data lines;
   a second parasitic capacitor formed between the plurality of data lines and pixel electrodes succeeding adjacent ones of the plurality of data lines; and
   a groove formed within a second side portion of the pixel electrode adjacent the plurality of data lines, wherein the second side portion is opposite the first side portion, so that the pixel electrode has a substantially diagonally symmetric shape.

2. The liquid crystal display panel according to claim 1, wherein the first horizontal line and the second horizontal line are alternately arranged within the liquid crystal display panel, and wherein within a vertical line of liquid crystal cells, every other liquid crystal cell is a liquid crystal cell from the first horizontal line.

3. The liquid crystal display panel according to claim 1, wherein the first horizontal line and the second horizontal line are alternately arranged within the liquid crystal display panel, and wherein within a vertical line of liquid crystal cells, every two liquid crystal cells are liquid crystal cells from the first horizontal line.

4. The liquid crystal display panel according to claim 1, wherein within the first horizontal line, the groove is at the second portion of the pixel electrode adjacent a succeeding data line, and within the second horizontal line, the groove is at the second portion of the pixel electrode adjacent a preceding data line.

5. The liquid crystal display panel according to claim 1, wherein
within the first horizontal line, consecutive ones of the liquid crystal cells are charged with pixel signals having alternating, opposite polarities;
within the second horizontal line, consecutive ones of the liquid crystal cells are charged with pixel signals having alternating, opposite polarities; and
wherein within the first and second horizontal lines, consecutive ones of the liquid crystal cells arranged within a vertical line, are charged with pixel signals having alternating, opposite polarities.

6. The liquid crystal display panel according to claim 1, wherein a side length of the second portion of a first pixel electrode having the groove facing an adjacent data line is substantially equal to a side length of a portion of a second pixel electrode facing the adjacent data line.

7. The liquid crystal display panel according to claim 1, wherein the groove minimizes a parasitic capacitance differential between the first parasitic capacitor and the second parasitic capacitor.

8. A liquid crystal display panel, comprising:
a plurality of gate lines;
a plurality of data lines crossing the plurality of gate lines; and
a plurality of liquid crystal cells arranged in a matrix pattern defined by the crossings, wherein each of the plurality of liquid crystal cells includes a pixel electrode and a thin film transistor coupled between an adjacent gate line, an adjacent data line, and the pixel electrode, wherein the pixel electrode has a groove formed at a diagonally opposite portion to the thin film transistor, and wherein thin film transistors of consecutive ones of the plurality of liquid crystal cells arranged within a vertical line are alternately coupled to adjacent ones of the plurality of data lines.

9. The liquid crystal display panel according to claim 8, wherein thin film transistors of every two consecutively arranged ones of the plurality of liquid crystal cells arranged within a vertical line are alternately coupled to adjacent ones of the plurality of data lines.

10. The liquid crystal display panel according to claim 8, wherein thin film transistors of consecutive ones of the liquid crystal cells arranged within a first horizontal line are coupled to preceding ones of the plurality of data lines.

11. The liquid crystal display panel according to claim 8, wherein thin film transistors of consecutive ones of the liquid crystal cells arranged within a second horizontal line are coupled to succeeding ones of the plurality of data lines.

12. The liquid crystal display panel according to claim 8, wherein consecutive ones of the liquid crystal cells arranged within a horizontal line are charged with data signals having opposite polarity.

13. The liquid crystal display panel according to claim 8, wherein a parasitic capacitance between the pair of pixel electrodes and the single data line are substantially equal.

14. The liquid crystal display panel according to claim 8, wherein the side of the pair of pixel electrodes has substantially the same length.

15. A liquid crystal display panel, comprising:
a plurality of consecutively arranged, substantially parallel data lines; and
a plurality of pixel electrodes arranged in a matrix pattern adjacent the plurality of data lines, wherein each pixel electrode within the plurality has a cut-out portion facing an adjacent data line opposite to a thin film transistor, wherein the cutout portion is at a diagonally opposite portion of the pixel electrode to the thin film transistor, and wherein thin film transistors of consecutive ones of the plurality of liquid crystal cells arranged within a vertical line are alternately coupled to adjacent ones of the plurality of data lines.

16. A liquid crystal display panel, comprising:
a plurality of consecutively arranged, substantially parallel data lines; and
a plurality of pixel electrodes arranged in a matrix pattern adjacent the plurality of data lines, wherein each pixel electrode within the plurality has a groove facing an adjacent data line and a substantially diagonally symmetric shape so that a parasitic capacitance at side portions of the plurality of pixel electrodes adjacent the plurality of data lines is substantially equal, and wherein thin film transistors of consecutive ones of the plurality of liquid crystal cells arranged within a vertical line are alternately coupled to adjacent ones of the plurality of data lines.

17. A method of making a liquid crystal display panel, comprising:
forming a plurality of consecutively arranged, substantially parallel data lines; and
forming a plurality of pixel electrodes arranged in a matrix pattern adjacent the plurality of data lines, wherein each pixel electrode within the plurality has a groove facing an adjacent data line and a substantially diagonally symmetric shape so that a parasitic capacitance at side portions of the plurality of pixel electrodes adjacent the plurality of data lines is substantially equal, and wherein thin film transistors of consecutive ones of the plurality of liquid crystal cells arranged within a vertical line are alternately coupled to adjacent ones of the plurality of data lines.

* * * * *